W. MEINERSMANN.
ELECTRIC FURNACE.
APPLICATION FILED JAN. 30, 1920.
1,434,395.
Patented Nov. 7, 1922.
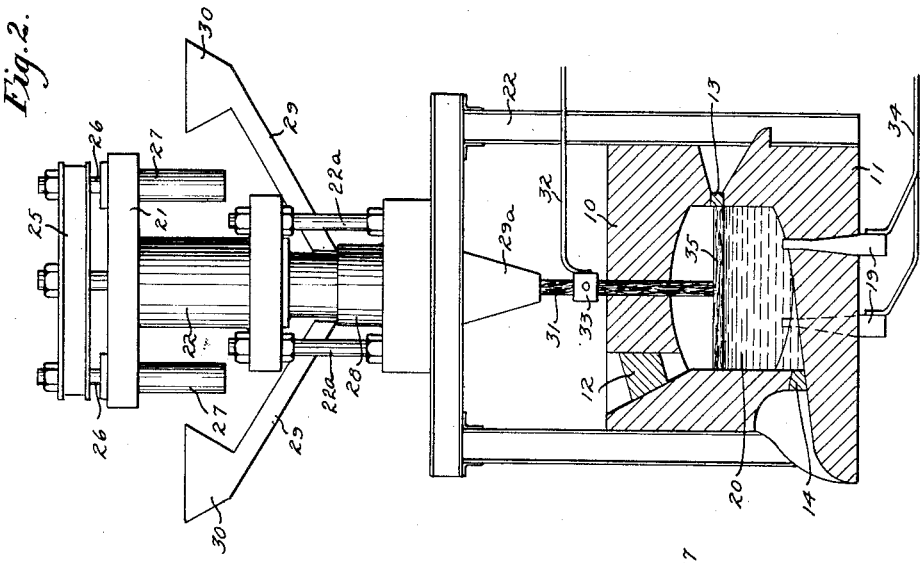
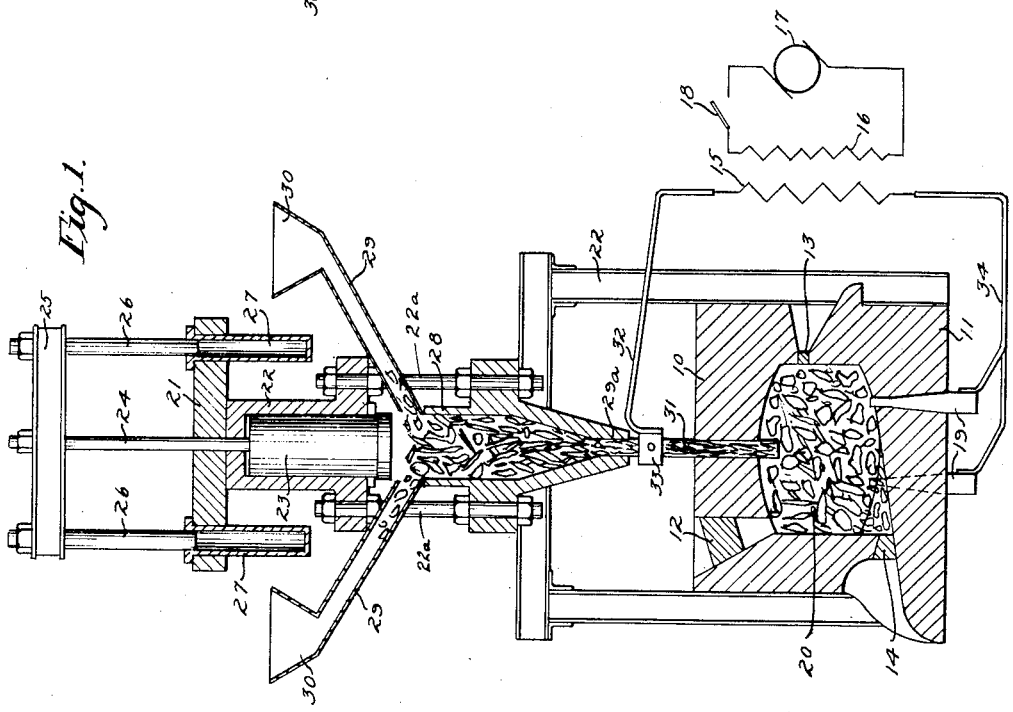
WITNESSES
INVENTOR
William Meinersmann
BY
ATTORNEYS Patented Nov. 7, 1922.

1,434,395

UNITED STATES PATENT OFFICE.

WILLIAM MEINERSMANN, OF ELIZABETH, NEW JERSEY, ASSIGNOR TO METAL & THERMIT CORPORATION, OF CHROME, NEW JERSEY, A CORPORATION OF NEW JERSEY.

ELECTRIC FURNACE.

Application filed January 30, 1920. Serial No. 355,164.

*To all whom it may concern:*

Be it known that I, WILLIAM MEINERSMANN, a citizen of the United States, and a resident of Elizabeth, in the county of Union and State of New Jersey, have invented a new and Improved Electric Furnace, of which the following is a full, clear, and exact description.

This invention relates to electric furnaces and has reference more particularly to a metal refining electric furnace with electrodes formed from scrap metal pressed into the desired shape.

This invention more specifically relates to the use of material such as detinned, degalvanized, or de-enameled scrap, detinned cans, steel turnings, punchings and the like, as an electrode for an electric furnace instead of the ordinary carbonaceous or graphite electrode, by pressing said material into the desired shape.

Heretofore, carbonaceous electrodes have been used in electric furnaces for the production of the highest grades of iron and steel, because of their non-fusibility and good electrical conductivity at high temperatures. An improvement on electrodes has been made whereby graphite is used instead of carbon, thereby resulting in greater purity of the electrolyte, better conductivity, and a greater resistance to oxidation than with the carbon electrode.

In the present electric furnace the carbonaceous electrodes frequently break off and fall into the molten metal where they are greedily absorbed, unless the broken part is quickly removed, so that the carbon content of the charge is raised. Also, the absorption of carbon by the charge takes place due to the constant burning away of electrodes, unless a heavy oxidizing slag is used to protect the molten metal.

An object of this invention is to obviate the difficulties experienced heretofore and increase the general efficiency of the electric furnace, the purity of the electrolyte, the conductivity, resistance to oxidation, mechanical strength, and cheapness of the electrodes, by the use of part of the charge itself as the electrode.

A further object of the invention is to separate from the charge of scrap to be melted, refined or alloyed, the scrap with the lowest carbon content and thus a higher melting point, and press it into any desired shape for use as electrodes.

The use of pressed scrap metal as electrodes has many advantages over the carbon and graphite electrodes. The scrap metal with a low carbon content is malleable and may be compressed into almost any form and is unusually strong after being so pressed. The material composing the metal electrode is so intermingled when pressed together and so strong that it may be supported through the walls and roof of the furnace at any angle and will not crack or break off at the high temperature of the furnace.

The scrap metal electrodes have an advantage over the carbon electrodes in that they may be continually fed forward toward the charge as the end of the electrode melts. Thus, less heat is conducted through the electrode from the inside to the outside of the furnace due to the inward motion of said electrode, since the inward velocity of the electrode may be increased, the hotter the electrode gets and the faster the end melts off.

This metallic electrode has another advantage in that it is necessary to use less than one-half the cross sectional area of a graphite electrode and only one-seventh the cross sectional area of a carbon electrode, for the same current density. This metallic electrode with a small cross section requires smaller openings in the roof or the sides of the furnace than the carabon or graphite electrode so that the cost of construction and upkeep of the furnace is considerably decreased. It also permits a better reflection of the heat from the roof and walls of the furnace onto the molten bath, so that less of the reflected heat is absorbed by the electrode than is the case with the larger carbon and graphite electrodes.

It is known that the thermal conductivity of metals decreases with a temperature increase while the thermal conductivity of carbon and graphite increases. Thus by using a metal electrode instead of one of carbon or graphite at the high temperature of the electric furnace, less heat is conducted from the inside to the outside of the furnace and the thermal efficiency of the furnace is further increased.

Still another advantage of this material as an electrode is the feasibility of mixing with it, the desired proportion of any reducing, oxidizing, carbonizing, fluxing, or alloying reagents, and pressing them into the form of an electrode. The pressing of these reagents into the crevices of the electrodes, provides a better refining and alloying operation than in the ordinary electric furnace. In the case of making a high carbon steel with this process, where the carbon content in the charge is not high enough for the finished product, the proper amount of carbon can be added and pressed into the electrode, thereby, making the carbon content in the charge always dependent on the amount of the electrode melted. This cannot be done in the ordinary electric furnace, because a heavy oxidizing slag is necessary to protect the molten metal from the carbonaceous electrodes. After the charge is melted and the slag has oxidized the impurities, it is removed and the required amount of carbon is then thrown in. The correctness and efficiency of this mixture of the carbon and the molten metal, depends on the length of the heat after the carbon is thrown in, together with the mixing obtained from the "pinch effect" of the electric current, which circulates and agitates the metal.

When this process is used for alloying, the alloying metal is pressed with the metallic electrode, passes through the hottest part of the furnace, which is at the end of the electrode, and is melted, always enough entering the charge to keep it up to the required composition so that a proper mixture throughout the entire charge is obtained. This method of making alloy steel eliminates the long heat required in the ordinary electric furnace after the charge is melted and the alloying metal is added.

Reference is to be had to the accompanying drawing forming a part of this specification in which it is understood that the drawing is merely illustrative of one example of the invention and in which—

Figure 1 is a longitudinal section through an electric induction furnace showing the improved metal electrode positioned ready for the start;

Figure 2 is a view similar to Figure 1 showing the charge melted.

Referring to the accompanying drawing by numerals, 10 indicates the roof of an electric arc furnace supported on a hearth 11, said furnace being provided with a charging door 12, a slag outlet door 13, and a door 14 for drawing off the molten metal. The furnace forms a part of the secondary circuit 15 of a transformer whose primary circuit 16 is connected in series with an alternating current generator 17, said primary circuit being closed by means of a key 18. A plurality of electrodes 19 of any desired material or construction are embedded in the hearth 11 so that their upper ends will make contact with a charge of metal 20 in the furnace. Positioned above the furnace is a press 21 which is supported by means of framework 22 and supports 22ª. The press 21 is provided with a cylinder 22 and a piston 23 slidably fitted to said cylinder. The piston may be reciprocated by any suitable means such as a piston rod 24 slidably mounted in the end of the cylinder 22, said piston rod being fixed to a cross beam 25 which carries the two guide rods 26 reciprocating in the guides 27 as the piston rod reciprocates. Any suitable mechanism (not shown) may be applied to the beam 25 to reciprocate the piston at a continuous or varying speed. Below the piston 23 is provided a hopper or cylinder 28 slightly larger than the piston 23, said hopper being loaded by means of a plurality of chutes 29 positioned above said hopper at an angle. The upper ends of the chutes 29 are provided with hoppers 30 into which may be loaded any scrap material such as detinned, degalvanized, de-enameled scrap, detinned cans, steel turnings, punchings and the like. The lower part of the hopper 28 is contracted to form an orifice 29ª so that when said hopper is filled with the scrap material by means of chutes 29 and the piston 23 is pressed downwardly into the hopper 28, the scrap material is pressed together by the contracted orifice 29ª and issues therefrom as a solid but somewhat porous stream 31 of the compressed scrap metal. One of the terminals 32 of the secondary transformer circuit 15 is fixed to a contact sleeve 33 which is removably fixed to the stream of scrap material 31 so that the position of the contact sleeve may be easily changed on said stream.

The stream of scrap material 31 passes through a hole in the roof 10 of the furnace and forms an electrode arranged to complete the circuit formed by the secondary circuit of the transformer, the terminal 32, contact sleeve 33, stream of compressed scrap metal 31, the charge 20 in the furnace, the electrodes 19 and terminals 34 on the secondary circuit 15 fixed to the electrodes 19.

It is understood that while the drawing discloses a single phase arc electric furnace, any other type of electric furnace may be used either in a single-phase or polyphase system. Also, the electrodes 19 may be positioned in any suitable place in the hearth, or walls of the electric furnace, and any number of metallic electrodes 31 may be used.

In operation the furnace is charged by removing the door 12 and filling the furnace with a charge of pig-iron, scrap iron or of any other metal to be alloyed or refined, or it may be desirable to fill the furnace primarily with molten metal. The electrode is so positioned at the start that it will make contact with the charge 20 and thus complete the circuit so that current can flow through the secondary circuit of the transformer when the key 18 in the primary circuit is closed. The charge at once melts down as shown in Figure 2 and some of the electrode melts and helps fill up the space above the electrolyte, with molten metal. It is desirable to reduce the air space above the electrolyte to the least possible volume by filling the furnace full, since said air tends to increase the loss of metal in the slag due to oxidation of said metal. If the melting of the electrode 31 does not bring the volume of the electrolyte up to the proper quantity the door 12 of the furnace may be removed again and a further charge of metal added. When it is desirable slagging material 35 may be added to the initial charge to modify the composition of the molten metal in the furnace or to act as a protective coating over the molten charge. This slag may be removed from the furnace by opening the door 13 and allowing said molten slag to run out of the furnace. When the molten metal has been heated in the furnace for a sufficient length of time the door 14 is opened and the molten metal is run into a suitable receiver.

It may be desirable to add slagging material along with the scrap metal in the hoppers 30 so that the electrode 31 will furnish a slag for the electrolyte without opening the charging door 12. With this method of operation, the loss due to oxidation of the charge by admitting air through the door 12, is reduced to a minimum.

It may be desirable to operate the furnace by withdrawing the slag from a molten charge and then add alloying metals by means of the electrode 31 until the entire charge has the proper composition for the alloy desired.

The furnace is especially adapted for the refining of scrap steel which at present finds little use in the steel industry. The scrap steel has a big oxidation loss in combustion furnaces due to the large surface exposed to the hot gases. It is also hard to melt it in a combustion furnace due to its high melting point. In the furnace described, little air reaches the metal and the scrap metal is easily melted by the arc. This furnace finds an important use in the making of the finest quality alloy steel.

I do not wish to be confined to a single metal electrode made of pressed scrap metal as similar results can be accomplished by using any number of these metallic electrodes.

I would state in conclusion that while the illustrated example constitutes a practical embodiment of my invention, I do not limit myself to the mechanical details herein illustrated, since manifestly the same can be considerably varied without departure from the spirit of the invention as defined in the appended claims.

What I claim as new and desire to secure by Letters Patent is:

1. The combination with an electric furnace of an electrode made of scrap metal pressed into shape.

2. The combination with an electric furnace of a moving electrode formed from scrap metal.

3. The combination with an electric furnace of a moving electrode composed of scrap metal and slagging materials pressed together into suitable shape.

4. The combination with an electric furnace of a moving electrode composed of scrap metal and alloying metals pressed together into suitable shape.

5. In an electric furnace, the combination of a roof, a hearth, means for charging said furnace with a metal, means for withdrawing said charge of metal, means for withdrawing slag from said furnace, one or more fixed electrodes associated with said furnace, one or more moving metal electrodes formed of compressed scrap metal and associated with said furnace, electrical connecting means between said moving electrodes and said fixed electrodes, said connecting means forming the secondary circuit of the transformer, and means for supplying an alternating current to the primary circuit of said transformer.

6. In an electric furnace, the combination of a roof, a hearth, means for charging said furnace with a metal, means for withdrawing said charge of metal, means for withdrawing slag from said furnace, one or more fixed electrodes associated with said furnace, a moving metal electrode formed of scrap metal pressed into shape associated with said furnace, electrical connecting means between said moving electrode and said fixed electrode, and means for supplying an electric current to said connecting means.

7. In an electric furnace, the combination of a roof, a hearth, means for charging said furnace with a metal, means for withdrawing said charge of metal, means for withdrawing slag from said furnace, a plurality of fixed electrodes associated with said furnace, a moving electrode consisting of scrap metal pressed into compact form, electrical connecting means between said moving electrode and said fixed electrodes, said connecting means forming the secondary circuit of the transformer, means for supplying the secondary circuit of the transformer, means for supplying an alternating current to the primary circuit of said transformer, and means for moving said electrode axially.

8. In an electric furnace, the combination of a roof, a hearth, means for charging said furnace with a metal, means for withdrawing said charge of metal, means for withdrawing slag from said furnace, a plurality of fixed electrodes associated with said furnace, a moving metal electrode consisting of scrap metal pressed into compact form, and means for supplying an electric current between said electrodes.

9. In an electric furnace, the combination of a roof, a hearth, means for charging said furnace with a metal, means for withdrawing said charge of metal, means for withdrawing slag from said furnace, one or more fixed electrodes associated with said furnace, a moving electrode consisting of scrap metal intermingled with some alloying metal, said metals being pressed into compact form, and means for supplying an electric current between said electrodes.

10. In an electric furnace, the combination of a roof, a hearth, means for charging said furnace with a metal, means for withdrawing said charge of metal, means for withdrawing slag from said furnace, a plurality of fixed electrodes associated with said furnace, a moving electrode consisting of scrap metal intermingled with some alloying metal, said metals being pressed into compact form, electrical connecting means between said moving electrode and said fixed electrodes, said connecting means forming the secondary circuit of a transformer, and means for supplying an alternating current to the primary circuit of said transformer.

11. In an electric furnace, the combination of a roof, a hearth, means for charging said furnace with a metal, means for withdrawing said charge of metal, means for withdrawing slag from said furnace, a plurality of fixed electrodes associated with said furnace, a moving electrode consisting of scrap metal intermingled with oxidizing, reducing, or fluxing materials, said electrode materials being pressed into compact form, and means for supplying an electric current between said electrodes.

12. In an electric furnace, the combination of a roof, a hearth, means for charging said furnace with a metal, means for withdrawing said charge of metal, means for withdrawing slag from said furnace, a plurality of fixed electrodes, associated with said furnace, one or more moving electrodes consisting of scrap metal intermingled with oxidizing, reducing, or fluxing materials, said electrode materials being pressed into compact form, electrical connecting means between said moving electrodes and said fixed electrodes, said connecting means forming a secondary circuit of a transformer, and means for supplying an alternating current to the primary circuit of said transformer.

13. In an electric furnace, the combination of a roof, a hearth, means for charging said furnace with a metal, means for withdrawing said charge of metal, means for withdrawing slag from said furnace, a plurality of fixed electrodes associated with said furnace, a cylinder positioned above said furnace and provided with a contracted end to form an orifice, a piston slidably mounted co-axially with said cylinder and positioned thereabove, means for supplying scrap metal to said cylinder, means for reciprocating said piston axially so as to compress the scrap metal in the cylinder and force it through said orifice in a compact stream, said stream being associated with said furnace to form a moving electrode, electrical connecting means between said moving electrode and the fixed electrodes, and means for supplying an electric current to said connecting means.

14. In an electric furnace, the combination of a roof, a hearth, means for charging said furnace with a metal, means for withdrawing said charge of metal, means for withdrawing slag from said furnace, a plurality of fixed electrodes, associated with said furnace, a cylinder positioned above said furnace and provided with a contracted end to form an orifice, a piston slidably mounted co-axially with said cylinder and positioned thereabove, means for supplying scrap metal intermingled with alloying metal, oxidizing, reducing, or fluxing materials to said cylinder, means for reciprocating said piston axially so as to compress the material in the cylinder, and force it through said orifice in a compact stream, said stream being associated with said furnace to form a moving electrode, electrical connecting means between said moving electrode and the fixed electrodes, and means for supplying an electric current to said connecting means.

15. The combination with an electric furnace, of a cylinder provided with a contracted end forming an orifice, a piston associated with said cylinder and mounted co-axially therewith, means for supplying scrap metal to said cylinder, means for reciprocating said piston in said cylinder so as to compress the scrap metal and force it in a compact stream through said orifice, said compact stream forming an electrode for said electric furnace, electrical connecting means forming a circuit with said moving electrode, and means for supplying an electric current to said circuit.

16. The combination with an electric furnace, of a cylinder provided with a contracted end forming an orifice, a piston associated with said cylinder and mounted co-axially therewith, means for supplying scrap metal intermingled with alloying metal, oxidizing, reducing, or fluxing materials, means for reciprocating said piston in said cylinder so as to compress the material in the cylinder and force it in a compact stream through said orifice, said compact stream forming an electrode for said electric furnace, electrical connecting means forming a circuit with said moving electrode, and means for supplying an electric current to said circuit.

WILLIAM MEINERSMANN.